United States Patent
Bax (10) Patent No.: US 7,778,803 B1
(45) Date of Patent: Aug. 17, 2010

(54) VALIDATION OF FUNCTION APPROXIMATION BY FUSION

(76) Inventor: Eric T Bax, 1267 N. Michigan Ave., Pasadena, CA (US) 91104

( * ) Notice: Subject to any disclaimer, the term of this patent is extended or adjusted under 35 U.S.C. 154(b) by 2243 days.

(21) Appl. No.: 09/677,334

(22) Filed: Sep. 28, 2000

Related U.S. Application Data (60) Provisional application No. 60/156,676, filed on Sep. 29, 1999.

(51) Int. Cl.
*G06F 17/10* (2006.01)
(52) U.S. Cl. .................. 703/2; 703/6; 706/12; 706/20; 707/100
(58) Field of Classification Search ............ 703/2, 703/6, 11, 12, 13, 20, 22; 706/16, 25, 26, 706/46, 47, 51, 52, 56, 57, 12, 20; 704/231, 704/230; 707/100
See application file for complete search history.

(56) References Cited

U.S. PATENT DOCUMENTS

| | | | | | |
|---|---|---|---|---|---|
| 5,377,307 | A | * | 12/1994 | Hoskins et al. | 706/25 |
| 5,793,933 | A | * | 8/1998 | Iwamasa | 706/45 |
| 5,819,247 | A | * | 10/1998 | Freund et al. | 706/25 |
| 5,970,239 | A | * | 10/1999 | Bahl et al. | 704/245 |
| 6,003,018 | A | * | 12/1999 | Michaud et al. | 705/36 |
| 6,108,372 | A | * | 8/2000 | Tidemann et al. | 375/225 |
| 6,167,390 | A | * | 12/2000 | Brady et al. | 706/26 |
| 6,246,975 | B1 | * | 6/2001 | Rivonelli et al. | 703/11 |
| 6,581,048 | B1 | * | 6/2003 | Werbos | 706/23 |
| 6,647,341 | B1 | * | 11/2003 | Golub et al. | 702/19 |
| 6,678,679 | B1 | * | 1/2004 | Bradford | 707/5 |
| 6,732,083 | B2 | * | 5/2004 | Bax | 706/12 |
| 6,850,873 | B1 | * | 2/2005 | Bax | 703/2 |

FOREIGN PATENT DOCUMENTS

WO        WO97/46929        * 12/1997 ................... 706/23

OTHER PUBLICATIONS

Bax, Partition-Based Uniform Error Bounds, 1998, IEEE.*
Bax et al., A New Error Bound for the Classifier Chosen by Early Stopping, 1997, IEEE.*
Bax, Validation of Fusion Through Linear Programming, Jul. 1999, IEEE.*
Gu et al., Towards More Practical Average Bounds on Supervised Learning, 1996, IEEE.*
Athans et al., On Optimal Distributed Decision Architectures in a Hypothesis Testing Environment, 1990, IEEE.*
"Rigorous Learning Curve Bounds from Statistical Mechanics", Haussler et al, Machine Learning 25, pp. 195-236, 1996.*

(Continued)

*Primary Examiner*—Fred Ferris (57) ABSTRACT

An error bound that indicates how well a hypothesis function approximates an unknown target function over a set of out-of-sample examples is computed from known error bounds for basis functions, as follows. An optimization problem is formed in which basis function error bounds imply constraints on feasible outputs of the target function over out-of-sample inputs. The optimization problem is solved to find an upper bound on the differences between the hypothesis function outputs and feasible target function outputs. This upper bound is a an error bound for the hypothesis function.

2 Claims, 1 Drawing Sheet

OTHER PUBLICATIONS

"Toward Efficient Agnostic Learning", Kearns et al, Machine Learning 17, pp. 115-141, 1994.*

"On the Relationship Between Error, Hypothesis Complexity, and Sample Complexity for Radial Bias Functions", Niyogi et al, MIT A.I. Memo No. 1467, Feb. 1994.*

Wassily Hoeffding "Probability Inequalities for Sums of Bounded Random Variables", Amercian Stat. Assoc. Journal Mar. 1963 pp. 13-30.

Vladimir N Vapnik *Statical Learning Theory*, John Wiley & Sons, 1998 pp. 156-159 and p. 192.

Eric Bax "Information on Data" White Paper, E. Bax, CIRCA 1998.

* cited by examiner

FIG. 1

VALIDATION OF FUNCTION APPROXIMATION BY FUSION

CROSS-REFERENCE TO RELATED APPLICATIONS

This invention relates to Provisional Application Ser. No. 60/156,676, filed Sep. 29, 1999. The contents of the application are incorporated by reference.

BACKGROUND OF THE INVENTION

Function approximation is a term applied to a process of producing a rule that can be used by a computer to figure out what to do when it meets a new set of circumstances. For example, function approximation may be used to evaluate the credit risk of credit card applicants. In this case, the function that we wish to approximate, called the target function, relates information about a credit card applicant to the most profitable credit limit for the credit card issuer. The exact form of this target function is not known to us, so we must approximate it with a hypothesis function, which a computer can use to set credit limits for applicants. If the hypothesis function is a good approximation of the target function, then the computer will produce credit limits that lead to good profits.

For another example, function approximation may be used to aid medical decisions. In this case, the target function may relate medical test results and other patient data to the fraction of a tumor that will be destroyed if a given treatment is used. If we can use function approximation to develop a hypothesis function that closely resembles the target function, then a computer system can aid the decision regarding which type of treatment a doctor and patient should choose.

For another example, function approximation may be used to develop a vehicle that drives itself. In this case, the target function may relate images from video cameras mounted on the vehicle to the brake pressure that should be applied for safe driving. A hypothesis function that closely approximates the target function could be implemented in a computer system onboard the vehicle.

In each of these examples, it is important to develop a hypothesis function that closely approximates the target function. It is also important to evaluate how well the developed hypothesis function approximates the target function. This evaluation is called validation. Fusion is a method of function approximation in which multiple functions, called basis functions, are combined to develop a hypothesis function. Fusion is useful because it can combine a variety of development efforts, with a variety of strengths, to form a single hypothesis function. The invention described here is a process that can be used to validate a hypothesis function developed through fusion. (The invention can also be used to validate other hypothesis functions.)

In function approximation, there is a target function that we do not know how to compute, and there is a distribution over the input space of the target function. For example, the input distribution could consist of images produced by a video camera mounted in a car, and the target function could be the brake pressure applied by a safe driver in response to the situation depicted in each image.

We have a set of in-sample examples with inputs drawn according to the input distribution and outputs determined by the target function. We also have a set of out-of-sample inputs drawn according to the input distribution. In the braking example, in-sample examples could be collected by recording video images and the corresponding brake pressure while a human drives the car. Out-of-sample inputs could be collected by recording video images under a variety of driving conditions.

The primary goal of function approximation is to use the in-sample examples to develop a hypothesis function that closely approximates the target function over out-of-sample inputs. The capability of a hypothesis function to closely approximate the target function over inputs not used to develop the hypothesis function is called generalization. In the braking example, the hypothesis function could be implemented by a computer system that receives video input and produces an output signal that communicates the desired brake pressure to a brake actuator. The goal is to use the in-sample examples to develop a computer system that mimics a safe human driver under a variety of conditions.

Another goal is to evaluate how well the hypothesis function generalizes, i.e., how well the hypothesis function approximates the target function over the out-of-sample inputs. The process of evaluating generalization is called validation. In the braking example, we wish to evaluate how well the computerized system mimics a safe human driver. This information allows us to either judge the system unsafe or deploy it with confidence.

Fusion is one method to develop a hypothesis function for function approximation. In fusion, the in-sample data are used to develop basis functions. Then a mixing function is developed. The mixing function combines the outputs of the basis functions into a single output to form the hypothesis function. In the braking example, several research groups can use different methods to develop different systems to control braking. These systems implement basis functions. Then another research group can develop a system that combines the outputs of the other systems into a single output. The system that combines outputs implements the mixing function. The combined systems implement the hypothesis function formed by fusion. One application of the invention described in this document is to validate the hypothesis function formed by fusion.

Now we describe prior art. One prior method to validate the hypothesis function formed by fusion is to withhold some in-sample data from the development of the hypothesis function, then use the performance of the hypothesis function on the withheld data to compute an error bound. This method has the disadvantage that the withheld data are not used to develop the hypothesis function. As a result, the hypothesis function formed by this method is generally a worse approximation of the target function than a hypothesis function developed using all in-sample data. So generalization, which is the primary goal of function approximation, tends to suffer under this method.

Another prior method to validate the hypothesis function formed by fusion is to use all in-sample data in all steps of developing the hypothesis function, then use the performance of the hypothesis function over the in-sample data to compute an error bound. In this case, the in-sample data are not independent of the hypothesis function, since they are used to develop it. So the error bound must be based on a statistical framework that uses uniform error bounds over the class of all possible hypothesis functions that might have been developed. (This class is independent of the in-sample data.) The class-based error bounds are weaker than error bounds based on a single function or a small set of functions. So validation, which is the secondary goal of function approximation, tends to suffer under this method.

The technique for validation of fusion that is presented in this document is an example of validation by inference. A prior technique of validation by inference is described in the paper "Alternative Error Bounds for the Classifier Chosen by Early Stopping", in the Proceedings of the IEEE Pacific Rim Conference on Communications, Computers, and Signal Processing 1997, in Victoria, B.C., Canada, pages 811 to 814, by E. Bax, Z. Cataltepe, and J. Sill, which is hereby incorporated in its entirety by reference. This earlier method of validation by inference is limited to using a single basis function. As a result, the hypothesis function error bound produced by this method is as weak or weaker than the single basis function error bound.

A prior method of validation by inference that uses multiple basis functions is described in the paper "Validation of Voting Committees", in the journal Neural Computation 1998, Volume 10, Issue 4, pages 975 to 986, by E. Bax, which is hereby incorporated in its entirety by reference. This method is limited to classification problems. The method does not apply to problems with continuous-valued functions, known as regression problems.

BRIEF SUMMARY OF THE INVENTION

The invention is a technique to validate a hypothesis function, i.e., to evaluate how well a hypothesis function approximates a target function over out-of-sample outputs. The evaluation is in the form of a statistical error bound for an error measure that sums over inputs, e.g., mean-squared difference between hypothesis function and target function outputs. The technique is based on knowing uniform error bounds for some basis functions and knowing basis function and hypothesis function outputs over out-of-sample inputs.

Each basis function error bound is a bound on the distance between the vector of basis function outputs over the out-of-sample inputs and the vector of target function outputs over the out-of-sample inputs. So each basis function error bound constraints the target function outputs over the out-of-sample inputs. The target function output vectors that meet all basis function constraints are the only feasible target function output vectors. The greatest distance between any feasible target function output vector and the hypothesis function output vector is an error bound for the hypothesis function. Hence, to bound the hypothesis function error, it suffices to bound the distance between the hypothesis function outputs and any feasible target function outputs.

Ideally, an optimization problem is formed in which each basis function bound implies a constraint on the feasible target function output vectors. Then the optimization problem is solved to find the feasible target function output vector that would imply the greatest error for the hypothesis function. Alternatively, a relaxed optimization problem is solved to compute a bound on the greatest possible distance between a feasible target function output vector and the hypothesis function output vector. Since the greatest possible distance is a hypothesis function error bound, the bound on this distance is also a hypothesis function error bound.

One use for the new method is to compute an error bound for a hypothesis function formed by fusion, as follows. We partition the in-sample data into training data and validation data. We use the training data to develop a set of basis functions. Then we use both training and validation data to develop a mixing function for the outputs of the basis functions, developing a hypothesis function through fusion.

To obtain a bound on the out-of-sample error of the hypothesis function, we first use the validation data to compute uniform error bounds for the basis functions. Then we develop a linear program with constraints based on basis function errors and similarities between the basis functions and the hypothesis function over the out-of-sample inputs. We solve the linear program to produce an out-of-sample error bound for the hypothesis function.

With this technique, the validation data are used to establish uniform bounds for the basis functions, so they must be withheld from the development of the basis functions. However, the validation data may be used to select the mixing function that produces the hypothesis function. Hence, all in-sample data play a role in the development of the hypothesis function.

Compare the new method to the method of withholding data from the development of the hypothesis function. Since the new method uses all in-sample data to develop the hypothesis function, the new method generally produces a more accurate hypothesis function. Thus, the new method has an advantage for the primary goal of function approximation—development of a hypothesis function that accurately approximates the target function.

Now compare the new method to the method of using all in-sample data to develop the hypothesis function and then computing a class-based error bound for the hypothesis function. Both methods have access to the same resources to develop the hypothesis function, so neither method has a competitive advantage for the goal of developing an accurate hypothesis function. However, the new method tends to produce a stronger error bound, because the error bound for the new method is based on uniform bounds over a few basis functions instead of uniform bounds over an entire class of prospective hypothesis functions.

The technique for validation by inference presented here also has advantages over previous techniques of validation by inference. The new method uses multiple basis functions. Consequently, it is possible to produce a hypothesis function bound that is stronger than the basis function bounds. Also, the new method applies to regression as well as classification problems.

DETAILED DESCRIPTION OF THE INVENTION

Overview

Figure 1:
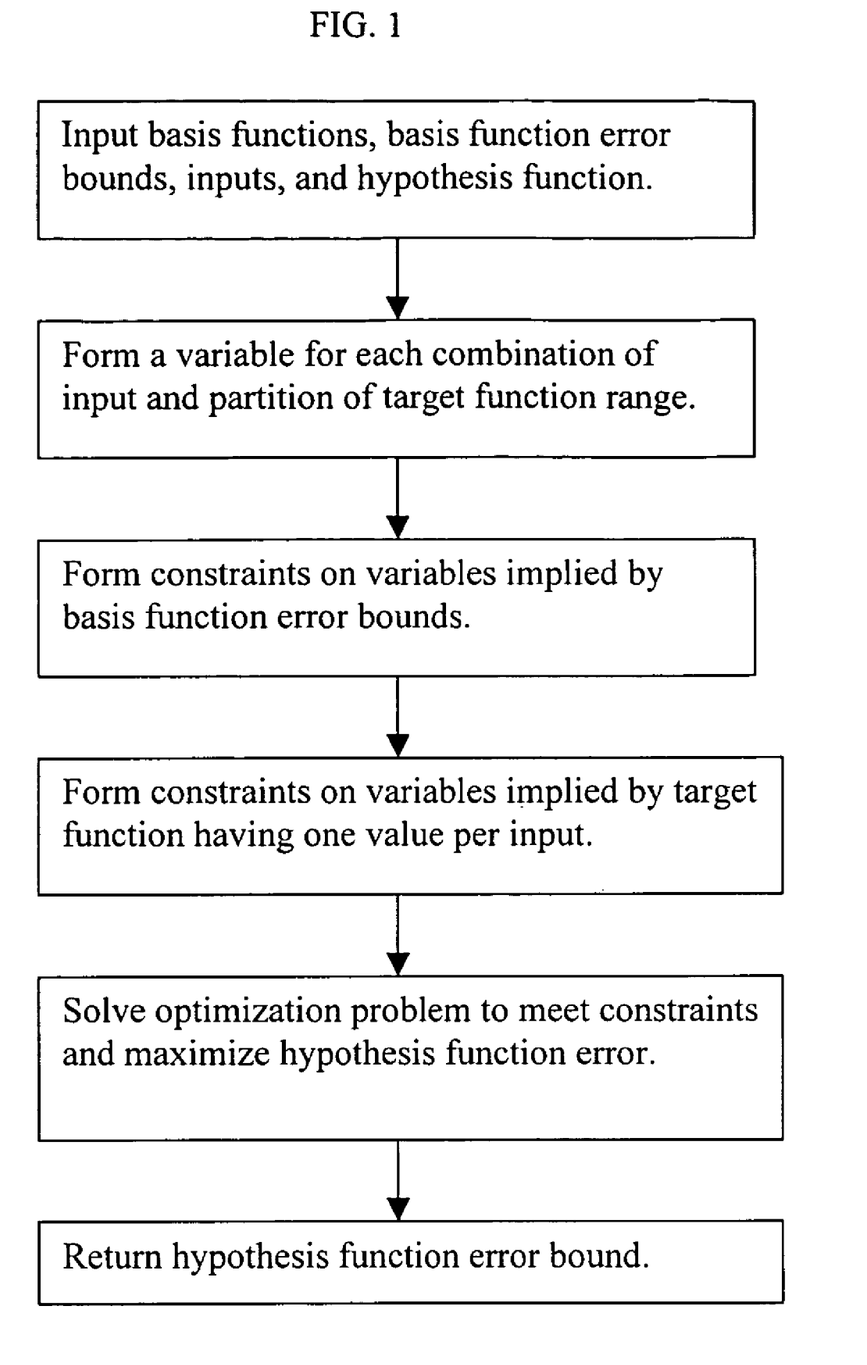
FIG. 1 is a flowchart that illustrates some steps in the process that is the invention; notes in boxes describe process steps.

In the next two subsections, we present the intuition underlying the validation method developed in this paper, and we review the uniform validation technique used to obtain uniform error bounds over the basis functions. In the following subsection, we develop the linear program to infer hypothesis error bounds from basis function error bounds. We show how the method extends beyond fusion to produce error bounds for early stopping and uniform error bounds over multiple hypothesis functions. Then we discuss the intuition behind the linear program. Also, we extend the linear programming technique by showing how to develop additional constraints. Finally, we present test results comparing bounds computed by linear programming to direct error bounds.

Intuition

We begin with a simple example to demonstrate the process of validation by inference. Consider a single basis function, $g_1$, and a single out-of-sample input, $x_1$. Use mean-squared difference as the error function. Let $f$ be the unknown target function. Suppose we have determined that the error of $g_1$ on $x_1$ is no more than 0.01, with probability at least 90%, i.e., $$Pr\{[g_1(x_1)-f(x_1)]^2 \leq 0.01\} \geq 90\%. \quad (1)$$

Our goal is to compute an error bound for a hypothesis function h. Suppose we find that $h(x_1)=0.3$ and $g_1(x_1)=0.2$. If the error bound for $g_1$ holds, then $|f(x_1)-g_1(x_1)| \leq 0.1$, so $f(x_1) \in [0.1, 0.3]$. The value in this range that maximizes the error of $h(x_1)$ is $f(x_1)=0.1$. In this case, the error is 0.04. Hence, with at least 90% probability, the error for the hypothesis function is at most 0.04.

This example illustrates the following procedure for bounding by inference:

1. Establish error bounds for basis functions.
2. Use the bounds and the basis function values on out-of-sample inputs to constrain the target function.
3. Find the value of the target function that satisfies the constraints and maximizes hypothesis function error.

Now extend the example to include an additional basis function, $g_2$. Suppose that we have uniform error bounds for the basis functions:

$$Pr\{[g_1(x_1)-f(x_1)]^2 \leq 0.01 \text{ and } [g_2(x_1)-f(x_1)]^2 \leq 0.01\} \geq 90\%. \quad (2)$$

Recall $g_1(x_1)=0.2$. Suppose $g_2(x_1)=0.35$. Then, with probability at least 90%, $f(x_1) \in [0.1, 0.3] \cap [0.25, 0.45]$.

Refer to [0.1, 0.3] and [0.25, 0.45] as constraint regions. Refer to [0.25, 0.3] as the feasible region. The target function value in the feasible region that maximizes hypothesis function error is 0.25. In this case, the error is 0.0025. So, with probability at least 90%, the hypothesis function has error 0.0025 or less.

Now extend the example to include an additional out-of-sample input, $x_2$. For simplicity, assume that the basis functions and the hypothesis function have the same values on $x_2$ as on $x_1$, i.e., $g_1(x_1)=g_1(x_2)=0.2$, $g_2(x_1)=g_2(x_2)=0.35$, and $h(x_1)=h(x_2)=0.3$. Once again, assume we have uniform error bounds for the basis functions, i.e., $$Pr\left\{\forall\, m \in \{1,2\} \frac{1}{2}([g_m(x_1)-f(x_1)]^2 + [g_m(x_2)-f(x_2)]^2) \leq 0.01\right\} \leq 90\%. \quad (3)$$

The basis function error bounds constrain the target function values $(f(x_1), f(x_2))$ to circles centered at the basis function values $(g_1(x_1), g_1(x_2))$ and $(g_2(x_1), g_2(x_2))$. The intersection of these constraint circles is the feasible region. The point in the feasible region with maximum distance from the hypothesis function values $(h(x_1), h(x_2))$ is the pair of target function values that produces the largest error for the hypothesis function among all target function pairs that satisfy the constraints. (If the feasible region is empty, then the uniform error bounds for the basis functions contain contradictions, so the basis function bounds are not valid.)

For our example, the radius of each constraint circle is $\sqrt{0.02}$, and the centers are (0.20, 0.20) and (0.35, 0.35). In the intersection of the constraint circles, the most distant points from the hypothesis function point (0.30, 0.30) are distance 0.01 away. Thus, the basis function bounds imply the hypothesis function bound $$\frac{1}{2}([h(x_1)-f(x_1)]^2 + [h(x_2)-f(x_2)]^2) \leq 0.005. \quad (4)$$

Note that in this simple example the hypothesis function bound is tighter than the basis function bounds.

Additional basis functions contribute additional constraints, and additional data contribute additional dimensions. In general, the feasible region is the intersection of M N-dimensional spheres, where M is the number of basis functions and N is the number of out-of-sample inputs. Basis functions with lower error and tighter error bounds correspond to smaller spheres and hence to stronger constraints.

To obtain a problem that is computationally tractable, we will use linear programming. We develop the linear program by partitioning the range to discretize the geometric problem of finding a point in the feasible region with greatest distance from the point given by the hypothesis function values on the out-of-sample inputs. In general, the solution of the linear program yields error bounds inferior to those produced by the exact solution of the geometric problem. Subdividing the partitions can produce superior error bounds, but this requires solving a linear program with more variables.

Review of Uniform Validation

Denote the basis functions by $g_1, \ldots, g_M$. Denote the target function by $f$. Let $E(g(x), f(x))$ be the error score for input x. Assume that E is monotonic in $|g(x)-f(x)|$ and that E has range [s, t]. Define the error score of g on a data set as the average of $E(g(x), f(x))$ over the inputs.

Let v be the error score of a basis function over the validation data, and let v' be the (unknown) error score over the out-of-sample data. Let D be the number of validation examples, and let N be the number of out-of-sample examples. Denote the negatives of the error scores on individual validation examples using random variables $X_1, \ldots, X_D$. Denote the error scores on out-of-sample examples using random variables $X_{D+1}, \ldots X_{D+N}$. Note that $$Pr\{v' \geq v + \epsilon(t-s)\} = \quad (5)$$

$$Pr\left\{\frac{X_1 + \ldots + X_D}{D} + \frac{X_{D+1} + \ldots + X_{D+N}}{N} \geq \epsilon(t-s)\right\}.$$

We will use results from the paper "Probability Inequalities for Sums of Bounded Random Variables", in the American Statistical Association Journal, 1963, pages 13 to 30, by W. Hoeffding, which is hereby incorporated in its entirety by reference. Using a result by Hoeffding from the paper, page 16, Equation 2.7, $$Pr\{v' \geq v + \epsilon(t-s)\} \leq e^{\frac{-2\epsilon^2}{(D^{-1}+N^{-1})}}. \quad (6)$$

If D=N, then we can derive a stronger and simpler result. In this case, $$Pr\{v' \geq v + \epsilon(t-s)\} = Pr\left\{\frac{X_1 + \ldots + X_{2N}}{N} \geq \epsilon(t-s)\right\}. \text{ So} \quad (7)$$

$$Pr\{v' \geq v + \epsilon(t-s)\} = Pr\left\{\frac{X_1 + \ldots + X_{2N}}{2N} \geq \frac{\epsilon}{2}(t-s)\right\}.. \quad (8)$$

Using another result from the paper by Hoeffding, page 16, Equation 2.6, $$Pr\{v' \geq v + \epsilon(t-s)\} \leq e^{-2N\epsilon^2}. \quad (9)$$

For the remainder of this paper, assume D=N. In practice, if D≠N, then substitute (6) for (9).

Let $v_m$ and $v'_m$ represent the validation and out-of-sample error scores for basis function $g_m$. Using the sum of probabilities to bound the probability of the union event, $$Pr\{v'_1 \geq v_1 + \epsilon(t-s) \text{ or } \ldots \text{ or } v'_M \geq v_M + \epsilon(t-s)\} \leq Me^{-2N\epsilon^2}. \quad (10)$$

In other words, with probability at least $1 - Me^{-2N\epsilon^2}$, for all basis functions, the out-of-sample error score is at most $\epsilon(t-s)$ greater than the validation error score. Refer to the out-of-sample error bound $v_m + \epsilon(t-s)$ as $b_m$.

Development of the Linear Program

Let h be the hypothesis function. Partition the range of the target function into $S_1, \ldots, S_K$. For each out-of-sample input $x_n$ and partition $S_k$, define $$y_{nk} = \begin{cases} 1 & \text{if } f(x_n) \in S_k \\ 0 & \text{otherwise} \end{cases} \quad (11)$$

Define $e_{mnk}$ to be the greatest lower bound on the error score for $g_m$, if $f(x_n) \in S_k$, i.e., $$e_{mnk} = \inf_{v \in S_k} E(g_m(x_n), v). \quad (12)$$

Similarly, let $c_{nk}$ be the least upper bound on error score for hypothesis function h if $f(x_n) \in S_k$, i.e., $$c_{nk} = \sup_{v \in S_k} E(h(x_n), v). \quad (13)$$

The out-of-sample error score for h is at most $$\frac{1}{N}\sum_{n=1}^{N}\sum_{k=1}^{K} c_{nk} y_{nk}. \quad (14)$$

The out-of-sample error bounds $b_1, \ldots, b_M$ for the basis functions imply the constraints:

$$\forall\ m \in \{1, \ldots, M\} \frac{1}{N}\sum_{n=1}^{N}\sum_{k=1}^{K} e_{mnk} y_{nk} \leq b_m. \quad (15)$$

Hence, the solution of the following integer linear program (ILP) is an upper bound on the out-of-sample error for the hypothesis function.

$$\text{maximize } \frac{1}{N}\sum_{n=1}^{N}\sum_{k=1}^{K} c_{nk} y_{nk} \quad (16)$$

$$\text{subject to } \forall\ m \in \{1, \ldots, M\} \frac{1}{N}\sum_{n=1}^{N}\sum_{k=1}^{K} e_{mnk} y_{nk} \leq b_m, \quad (17)$$

$$\forall\ n \in \{1, \ldots, N\} \sum_{k=1}^{K} y_{nk} = 1, \quad (18)$$

$$\text{and } \forall\ (n, k) \in \{1, \ldots, N\} \times \{1, \ldots, K\} y_{nk} \in \{0, 1\}.. \quad (19)$$

Solving this program may require extensive computation since integer linear programming is NP-complete. To produce a linear program, replace the integer constraints (19) by the constraints $$\forall (n,k) \in \{1, \ldots, N\} \times \{1, \ldots, K\} 0 \leq y_{nk} \leq 1. \quad (20)$$

This weakens the constraints, but it ensures that the program has a tractable solution.

Use of the Linear Program

Use the following process to develop basis functions and produce out-of-sample error bounds for a hypothesis function formed by fusion of basis function outputs.
1. Partition a set of in-sample data into a set of training data and a set of validation data.
2. Use the training data and a set of training procedures to develop a set of basis functions.
3. Use the validation data to compute a set of basis function error bounds, with each bound a constraint on the average over a set of out-of-sample inputs of an error function based on basis function outputs and target function outputs. (For example, choose some $\epsilon > 0$, and use Formula 10.)
4. Use fusion on the basis functions and the in-sample data to develop a hypothesis function.
5. Form an optimization problem in which:
   (a) error bounds for the basis functions and the outputs of the basis functions over the out-of-sample inputs are used to form a set of constraints on the outputs of the target function over the out-of-sample inputs
   (b) and the objective is to bound the average over the set of out-of-sample inputs of an error function based on hypothesis function outputs and target function outputs, subject to the constraints on the target function outputs.
   (The optimization problem may be an integer linear program, a linear program, or some other type of optimization problem. For example, the optimization problem may be the integer linear program of Formulas 16, 17, 18, and 19, or the optimization problem may be the linear program of Formulas 16, 17, 18, and 20.)

6. Solve the optimization problem to produce a hypothesis function error bound.

(Note that this Process May be Implemented Using a General Purpose Computer.) The solution is an out-of-sample error bound for the hypothesis function if the basis function bounds are all valid. For example, by Formula 10, the probability that the basis function bounds are all valid is at least $1-Me^{-2N\epsilon^2}$, where M is the number of basis functions, and N is the number of validation examples and the number of out-of-sample examples.

Note that the linear program bound is valid even if the hypothesis function is not the result of fusion of the basis functions. For example, an out-of-sample error bound for the hypothesis function chosen by early stopping can be computed as follows. Partition the in-sample data into a training set and a validation set. Choose a function at random. Use an iterative method to develop a function that approximates the training data well. Record the sequence of functions produced by the iterations. Sample these functions at intervals to form the set of basis functions. Use the validation data to compute uniform out-of-sample error bounds for the basis functions. Now compute the error over the validation data for every function in the iteration sequence. The function with minimum validation error is the function chosen by early stopping. It is our hypothesis function. With probability at least $1-Me^{-2N\epsilon^2}$, the solution to the linear program is a valid out-of-sample error bound. (For further details, refer to the paper "Alternative Error Bounds for the Classifier Chosen by Early Stopping", which is previously referenced.)

Note that if the uniform basis function bounds are valid, then, for every hypothesis function, the solution of the corresponding linear program is a valid out-of-sample error bound. Uniform basis function bounds logically imply uniform hypothesis function bounds. Thus, we can use linear programs to compute uniform out-of-sample error bounds for any number of hypothesis functions. With probability at least $1-Me^{-2N\epsilon^2}$, the bounds are all valid.

Bounds without Out-of-Sample Inputs

Briefly, consider the case in which out-of-sample inputs are unknown, but there is a method to generate inputs at random according to the input distribution. (For example, consider the case in which the input distribution is known.) Generate random sets of inputs having the same size as the out-of-sample data set. For each random data set, form and solve the linear program. Use these sample solutions to compute a probabilistic bound on the solution of the linear program for the out-of-sample inputs.

For example, generate 100 random data sets and solve them to generate 100 sample linear program solutions. Let v be the value of the fifth greatest sample solution. Then generate K more sample solutions. Let p be the fraction of these solutions with value greater than v. Let $\mu$ be the probability that the solution for a random data set has value greater than v. By a result in the paper by Hoeffding, page 16, Equation 2.6, $$Pr\{\mu \geq p+\hat{\epsilon}\} \leq e^{-2K\epsilon^2}. \tag{21}$$

Let w be the (unknown) linear program solution for the out-of-sample data. Recall from Formula 10 that the probability that the linear program solution w is not a valid out-of-sample error bound is at most $Me^{-2N\epsilon^2}$. Hence, the probability that $v+\epsilon(t-s)$ is a valid out-of-sample error bound is at least $$1-[Pr\{\mu \geq p+\hat{\epsilon}\}+Pr\{w>v|\mu<p+\hat{\epsilon}\}+Me^{-2N\epsilon^2}] \tag{22}$$

$$\geq 1-[e^{-2K\epsilon^2}+(p+\hat{\epsilon})+Me^{-2N\epsilon^2}]. \tag{23}$$

Extending the Linear Program

One strategy to derive additional constraints for the linear program is to validate some aspect of the behavior of the target function over the out-of-sample data, then identify constraints implied by the pattern of behavior. Validating upper bounds on the difference in behavior between the target function and the basis functions (the out-of-sample error) yields the original constraints. Additional constraints can be derived by validating lower bounds on out-of-sample error. Extend the uniform upper bounds for basis function errors in Formula 10 to include lower bounds:

$$Pr\{\forall m\in\{1,\ldots,M\}|v'_m-v_m|<\epsilon(t-s)\}\leq 1-2Me^{-2N\epsilon^2}. \tag{24}$$

The lower bounds imply the following additional constraints for the linear program.

$$\forall m \in \{1, \ldots, M\} \frac{1}{N}\sum_{n=1}^{N}\sum_{k=1}^{K} e'_{mnk} y_{nk} \geq b'_m, \tag{25}$$

where $b'_m = v_m - \epsilon(t-s)$ is the lower bound corresponding to upper bound $b_m$, and $e'_{mnk}$ is the greatest lower bound corresponding to least upper bound $e_{mnk}$.

More constraints can be derived by validating the frequency distribution of the target function output. Recall that the linear program is based on partitioning the range of the target function into subranges $S_1, \ldots, S_K$. Let $p_k$ be the fraction of validation inputs for which the target function is in $S_k$. Let $p'_k$ be the (unknown) fraction of out-of-sample inputs for which the target function is in $S_k$. Refer to $p_k$ and $p'_k$ as placement frequencies. Extend the uniform bounds for basis function errors to include bounds for placement frequencies:

$$Pr\{\forall m\in\{1,\ldots,M\}|v'_m-v_m|\leq\epsilon(t-s) \text{ and } \forall k\in\{1,\ldots,K\}|p'_k-p_k|<\epsilon\} \tag{26}$$

$$\leq 1-2(M+K)e^{-2N\epsilon^2}. \tag{27}$$

The placement frequency bounds imply the following additional constraints for the linear program.

$$\forall k \in \{1, \ldots, K\} p_k - \epsilon \leq \frac{1}{N}\sum_{n=1}^{N} y_{nk} \leq p_k + \epsilon. \tag{28}$$

Other constraints can be derived by validating the rank of the target function output among basis function outputs. For $m\in\{0,\ldots,M\}$, let $r_m$ be the fraction of validation inputs for which exactly m of the basis function outputs are less than or equal to the target function value. Let $r'_m$ be the corresponding fraction for out-of-sample inputs. Refer to $r_m$ and $r'_m$ as rank frequencies. Extend the uniform bounds for basis function errors to include bounds for rank frequencies:

$$Pr\{\forall m\in\{1,\ldots,M\}|v'_m-v_m|\leq\epsilon(t-s) \text{ and } \forall m\in\{0,\ldots,M\}|r'_m-r_m|\leq\epsilon\} \tag{29}$$

$$\leq 1-2(M+M+1)e^{-2N\epsilon^2}. \tag{30}$$

Use the following partitioning scheme to produce the linear program. Let the number of subranges be one more than the number of basis functions, i.e., let K=M+1. For each input, for each k∈{1, . . . , K}, define $S_k$ to be the portion of the range containing values greater than exactly k−1 basis function outputs. This partitioning scheme maintains the original constraints implied by the basis function error bounds, and the rank frequency bounds imply the following additional constraints.

$$\forall \ k \in \{1, \ldots, K\} r_k - \epsilon \leq \frac{1}{N} \sum_{n=1}^{N} y_{nk} \leq r_k + \epsilon. \tag{31}$$

Within this partitioning framework, there are many frequency distributions that can be validated to produce further constraints. Examples include the rank frequencies for a subset of the basis functions and the frequency with which the target function output is between the outputs of some pair of basis functions. To increase the number of partitions within this framework, subdivide each subrange $S_k$ into equal-sized sub-subranges, then adjust the constraints accordingly.

Choose the constraints for a given problem without reference to the validation data and the out-of-sample inputs. This restriction ensures the validity of the Hoeffding bounds for uniform validation of the properties that imply the constraints. Choose the nature of the constraints using training data and prior knowledge about the problem. Choose the number of constraints according to the number of validation examples and out-of-sample inputs available. More constraints mean weaker individual constraints, because more constraints require uniform validation of more properties.

Tests

This section outlines the results of tests on two sets of data. The first data set contains information on credit card users. The second data set contains information on individuals at risk for diabetes. For each data set, the tests compare out-of-sample error bounds produced by linear programming to error bounds produced by applying VC (Vapnik-Chervonenkis) theory directly.

In the first data set, each example corresponds to a credit card user. There are five inputs, corresponding to user traits. A sixth trait is used as the target function. The traits are unknown because the data provider has chosen to keep them secret. The data were obtained from the machine-learning database site at the University of California at Irvine. The discrete-valued traits were removed, leaving the six continuous-valued traits. Of the 690 examples in the original database, 24 examples had at least one trait missing. These examples were removed, leaving 666 examples. The data were cleaned by Joseph Sill. The target function values were constrained to the range [−1.25, 1.75]. In each test, basis function and hypothesis function outputs were also constrained to this range, producing the squared error range [s, t]=[0, 9].

In each test, the 666 examples were randomly partitioned into 444 training examples, D=111 validation examples, and N=111 out-of-sample examples. In each test, M=10 basis functions were trained by early stopping. Then a hypothesis function was formed by linear fusion of the basis classifier outputs.

For each basis function, the training data were randomly partitioned into 333 examples used for actual training and 111 examples used for early stopping. The basis functions were artificial neural networks with five input units, five hidden units, and one output unit. The hidden units had tan h activation functions. The initial weights were selected independently and uniformly at random from [−0.1, 0.1]. Each network was trained by gradient descent on mean squared error over training examples, using sequential mode weight updates with random order of example presentation in each epoch. A snapshot of the weights was recorded after each epoch. The snapshot with minimum error on the 111 early stopping examples was returned as the trained basis function. In each test, the hypothesis function was formed by finding the linear combination of basis function outputs with least squared error over the in-sample data.

Uniform error bounds with 90% confidence were used for both the linear program bound and the direct VC bound. For the linear program, uniform error bounds over the basis functions are attained for $\epsilon$ small enough that $$1 - 10 e^{-2 \cdot 111 \epsilon^2} \geq 0.90. \tag{32}$$

The best solution is $\epsilon$=0.144. The target function range [0, 9] was partitioned into K=1000 intervals to form the linear program.

For the VC bound, we require uniform bounds over the class of 10-dimensional hyperplanes, with 111 validation examples and 111 out-of-sample examples. Using the growth function for linear indicator functions in the book "Statistical Learning Theory", by V. N. Vapnik 1998, which is hereby incorporated in its entirety by reference, pages 156 to 159, and following the bound derived for general linear functions in the same book, on page 192, produces the formula for the minimum $\epsilon$ that gives 90% confidence:

$$\epsilon = \sqrt{\frac{-\ln \frac{0.10}{m(2 \cdot 111)}}{2 \cdot 111}}, \tag{33}$$

where m( ) is the growth function for 10-dimensional hyperplanes. The solution is $\epsilon$=0.392. Hence, the direct VC out-of-sample error bound is the error over the validation data plus $\epsilon$(t−s)=0.392·9.

Table 1 shows the results for each test. Note that the linear program consistently produces out-of-sample error bounds that are tighter than direct VC bounds.

In the second data set, each example corresponds to a patient tested for diabetes. The seven inputs include basic personal information and results of simple tests. The target function is the result of an oral glucose tolerance test, an indicator of diabetes mellitus. The data were obtained from the machine-learning database repository at the University of California at Irvine. All function values were constrained to the range [0, 200]. So the squared error was constrained to the range [s, t]=[0, 40000].

In each test, the 768 examples were randomly partitioned into 368 training examples, D=200 validation examples, and N=200 out-of-sample examples. In each test, M=5 basis functions were trained by early stopping in a similar manner to the tests on credit card data. The training examples were partitioned into 276 for actual training and 92 for early stopping. The basis functions were networks with seven input units, four hidden units, and a single output unit. The hidden units had tan h activation functions. The initial weights were selected independently and uniformly at random from [−20, 20]. In each test, the hypothesis classifier was formed by finding the linear combination of basis function outputs with least squared error over the validation data. The error score range was partitioned into K=100 regions to form the linear program for each test.

Both the linear program error bounds and the direct VC error bounds were based on uniform error bounds with 90% confidence. For the linear program bound, $\epsilon=0.099$ achieves this confidence, since there are M=5 basis classifiers, D=200 validation examples, and N=200 out-of-sample examples. For the VC bound, $\epsilon=0.244$ is required to have 90% confidence in uniform bounds over the class of five-dimensional linear functions. Table 2 shows the results for each test. Note that the linear program consistently produces tighter out-of-sample error bounds than the direct VC bounds.

In some simple examples in Section 2, validation by inference produces lower out-of-sample error bounds for the hypothesis function than the out-of-sample error bounds for the basis functions. To observe the relationship between hypothesis function and basis function bounds in these tests, the minimum basis function error bound was recorded for each test. Table 3 displays the averages over the 10 tests on each data set of the hypothesis function bound produced by linear programming and the minimum basis function bound. Note that the hypothesis function bounds are higher than the minimum basis function bounds. It is not clear how much of the difference in bounds is caused by the underlying geometry of validation by inference, i.e., the differences in behavior between the hypothesis function and the basis functions over the out-of-sample inputs, and how much of the difference is caused by using linear programming to convert the underlying geometric problem into a problem that is computationally tractable.

For these tests, the differences in error bounds show that a lower error bound can be achieved by selecting the basis function with minimum validation error than by developing a hypothesis function through fusion. However, the selected function may not perform as well as the fusion function. Table 4 confirms that the average out-of-sample error is lower for the fusion functions than for the basis functions with minimum validation error. Hence, the methods developed

TABLE 1

Test results for credit data. Error bounds are for the hypothesis function, which is a linear combination of the outputs of 10 basis functions. The maximum possible error score is 9.

| Test | Linear Program Out-of-Sample Error Bound | Direct VC Out-of-Sample Error Bound |
|---|---|---|
| 1 | 2.13 | 4.27 |
| 2 | 2.09 | 4.12 |
| 3 | 2.17 | 4.19 |
| 4 | 2.05 | 4.11 |
| 5 | 2.02 | 4.07 |
| 6 | 2.07 | 4.18 |
| 7 | 2.04 | 4.11 |
| 8 | 2.18 | 4.16 |
| 9 | 2.16 | 4.21 |
| 10 | 2.09 | 4.04 |
| avg | 2.10 | 4.15 |

TABLE 2

Test results for diabetes data. Error bounds are for the hypothesis function, which is a linear combination of the outputs of 5 basis functions. The maximum possible error score is 40000.

| Test | Linear Program Out-of-Sample Error Bound | Direct VC Out-of-Sample Error Bound |
|---|---|---|
| 1 | 5495 | 10556 |
| 2 | 5226 | 10530 |
| 3 | 5868 | 10515 |
| 4 | 5361 | 10696 |
| 5 | 5394 | 10621 |
| 6 | 5690 | 10642 |
| 7 | 5600 | 10669 |
| 8 | 5262 | 10590 |
| 9 | 5372 | 10557 |
| 10 | 5474 | 10680 |
| avg | 5752 | 10606 |

TABLE 3

Average out-of-sample error bounds for the hypothesis functions and the basis functions with minimum validation error. The hypothesis function bounds are the results of linear programs based on function error bounds. The basis function bounds are the results of uniform validation over basis functions.

| Data Set | Hypothesis Function Average Out-of-Sample Error Bound | Basis Function Average Out-of-Sample Error Bound |
|---|---|---|
| Credit | 2.10 | 1.92 |
| Diabetes | 5752 | 4823 |

TABLE 4

Average out-of-sample errors for the hypothesis functions resulting from fusion and the basis functions with minimum validation error.

| Data Set | Hypothesis Function Average Out-of-Sample Error | Basis Function Average Out-of-Sample Error |
|---|---|---|
| Credit | 0.584 | 0.605 |
| Diabetes | 949 | 963 |

There are appropriate when fusion yields more effective hypothesis functions than selection of a single basis function, and performance has priority over error bounds.

I claim:

1. A method for producing in a computer system an error bound for a hypothesis function, comprising:
forming a set of variables comprising a variable corresponding to each combination of an input in a set of inputs and a partition in a partitioning of the range of a target function on the input;
forming a set of constraints on the values of the variables, comprising a constraint corresponding to each basis function in a set of basis functions, constraining the values of the target function as implied by an error bound on the basis function;
forming a set of constraints on the values of the variables, comprising a constraint corresponding to each input, constraining the values of the target function as implied by the target function having one value per input;

solving an optimization problem that is a linear program or an integer linear program over the set of variables under the set of constraints, with the solution indicating target function values or distributions of target function values on the inputs that maximize the error of the hypothesis function;

computing the hypothesis function error bound implied by the solution to the optimization problem;

and storing the result.

2. A program, stored on a computer readable medium, that when executed on a computer produces an error bound for a hypothesis function through steps comprising:

forming a set of variables comprising a variable corresponding to each combination of an input in a set of inputs and a partition in a partitioning of the range of a target function on the input;

forming a set of constraints on the values of the variables, comprising a constraint corresponding to each basis function in a set of basis functions, constraining the values of the target function as implied by an error bound on the basis function;

forming a set of constraints on the values of the variables, comprising a constraint corresponding to each input, constraining the values of the target function as implied by the target function having one value per input;

solving an optimization problem that is a linear program or an integer linear program over the set of variables under the set of constraints, with the solution indicating target function values or distributions of target function values on the inputs that maximize the error of the hypothesis function;

computing the hypothesis function error bound implied by the solution to the optimization problem;

and storing the result.

* * * * *